(12) United States Patent
Yamauchi (10) Patent No.: US 9,135,554 B2
(45) Date of Patent: Sep. 15, 2015

(54) ROBOT CONTROLLER LEARNING SYSTEM

(71) Applicant: iRobot Corporation, Bedford, MA (US)

(72) Inventor: Brian Masao Yamauchi, Boston, MA (US)

(73) Assignee: iRobot Corporation, Bedford, MA (US)

( * ) Notice: Subject to any disclaimer, the term of this patent is extended or adjusted under 35 U.S.C. 154(b) by 277 days.

(21) Appl. No.: 13/741,902

(22) Filed: Jan. 15, 2013

(65) Prior Publication Data

US 2015/0231784 A1    Aug. 20, 2015

Related U.S. Application Data

(60) Provisional application No. 61/614,957, filed on Mar. 23, 2012.

(51) Int. Cl.
| G06E 1/00 | (2006.01) |
|---|---|
| G06E 3/00 | (2006.01) |
| G06F 15/18 | (2006.01) |
| G06G 7/00 | (2006.01) |
| G06N 5/00 | (2006.01) |

(52) U.S. Cl.
CPC ......................................... *G06N 5/00* (2013.01)

(58) Field of Classification Search
CPC ........... G05B 13/00; G06N 3/00; G06N 5/00; C06E 1/00; C06E 3/00; G06F 15/18; G06G 7/00
USPC .......................................................... 706/24
See application file for complete search history.

(56) References Cited

U.S. PATENT DOCUMENTS

2006/0041332 A1 *   2/2006   Sabe et al. .................... 700/245

OTHER PUBLICATIONS

'Sentinel: An Operator Interface for the Control of Multiple Semi-Autonomous UGVs': Jones, 2006, Proceedings of the Association for Unmanned Vehicles . . . , 2006.*
'Daredevil: Ultra-wideband radar sensing for small UGV sDaredevil: Ultra-wideband radar sensing for small UGV s': Yamauchi, 2007, Defense and Security Symposium.*
'UAV-UGV Collaboration \vitb a PackBot UGV and Raven SUAV for Pursuit and Tracking of a Dynamic Target': Cheung, 2008, SPIE Defense . . . , 2008-proceedings.spiedigitallibrary.org.*
'Stingray: High-speed control of small UGV s in urban terrain': Yamauchi, 2009, SPIE Defense, . . . , 2009-proceedings. spiedigitallibrary.*

* cited by examiner

*Primary Examiner* — Kakali Chaki
*Assistant Examiner* — Peter Coughlan
(74) *Attorney, Agent, or Firm* — Honigman Miller Schwartz and Cohn LLP (57) ABSTRACT

A threshold learning control system for learning a controller of a robot. The system includes a threshold learning module, a regime classifier, and an exploratory controller, each receiving sensory inputs from a sensor system of the robot. The regime classifier determines a control regime based on the received sensor inputs and communicates the control regime to the threshold learning module. The exploratory controller also receives control parameters from the threshold learning module. A control arbiter receives commands from the exploratory controller and limits from the threshold learning module. The control arbiter issues modified commands based on the received limits to the robot controller.

22 Claims, 9 Drawing Sheets

ROBOT CONTROLLER LEARNING SYSTEM

CROSS REFERENCE TO RELATED APPLICATIONS

This U.S. patent application claims priority under 35 U.S.C. §119(e) to U.S. provisional application 61/614,957, filed on Mar. 23, 2012, which is hereby incorporated by reference in its entirety.

STATEMENT AS TO FEDERALLY SPONSORED RESEARCH

This invention was in part with Governmental support under contract W91CRB-11-C-0049 awarded by the Army—RDECOM of Aberdeen, Md. The Government may have certain rights in the invention.

TECHNICAL FIELD

This disclosure relates to robot controller learning systems and methods of learning robot controllers.

BACKGROUND

Robots are useful in a variety of civilian, military, and law enforcement applications. For instance, some robots may inspect or search buildings with structural damage caused by earthquakes, floods, or hurricanes, or inspect buildings or outdoor sites contaminated with radiation, biological agents such as viruses or bacteria, or chemical spills. Some robots carry appropriate sensor systems for inspection or search tasks. Robots designed for military applications may perform operations that are deemed too dangerous for soldiers. For instance, the robot can be used to leverage the effectiveness of a human "point man." Law enforcement applications include reconnaissance, surveillance, bomb disposal and security patrols.

Relatively small robots operating at relatively increased speed would reduce the time required to perform missions and would reduce a time of potential exposure to danger for an operator. However, it can be difficult for a remote operator to control a small robot at high speeds, due to increased relative speed (as compared to a larger robot) and the greater effect of small obstacles and terrain variations on robot handling. What is needed, therefore, are driver-assist behaviors that can simplify the remote operation of small robots at high speeds.

Robots can lose their balance and roll over in rough terrain. When this occurs, the operator may be forced to manually reorient the robot, potentially exposing the operator to danger. What is needed, therefore, are stability-control behaviors that can prevent robots from rolling over in rough terrain.

SUMMARY

One aspect of the disclosure provides a threshold learning control system for learning a robot controller of a robot. The system includes a threshold learning module, a regime classifier, and an exploratory controller, each receiving sensory inputs from a sensor system of the robot. The regime classifier determines a control regime based on the received sensor inputs and communicates the control regime to the threshold learning module. The exploratory controller also receives control parameters from the threshold learning module. A control arbiter receives commands from the exploratory controller and limits from the threshold learning module. The control arbiter issues modified commands based on the received limits to the robot controller.

Implementations of the disclosure may include one or more of the following features. In some implementations, the threshold learning module sets limits for the commands issued by the exploratory controller based on the received sensor inputs. The control arbiter modifies the commands received from the exploratory controller based on the limits received from the threshold learning module. The threshold learning module may issue control parameters to the exploratory controller based on received sensor inputs and feedback received from the control arbiter of executed modified commands. Moreover, the threshold learning module may issue control parameters that cause the exploratory controller to issue commands that alter a control state of the robot toward a desired control regime, for example, a control regime having a regime score above a first threshold value and/or away from a control regime having a regime score below a second threshold value. In some examples, the first and second threshold values are equal. When the first and second threshold values are not equal, a neutral range exists therebetween.

The regime classifier may receive at least one state-action map. Each state-action map has control regimes arranged contiguously with boundaries therebetween. Moreover, each control regime provides a space of possible robot states and robot actions in a corresponding control space.

In some implementations, the threshold learning module receives one or more anchor points. Each anchor point is associated with a control regime and defines a point in the state-action space. The regime classifier may determine the control regime of the robot using the one or more anchor points. In some examples, the regime classifier determines the control regime of the robot by determining a proximity of a current robot state and robot action with respect to the one or more anchor points using received sensor inputs. In other words, the regime classifier determines whether the current robot state and action values are closer to an anchor point than previously observed state-action pairs that have been observed to be within the corresponding control regime for the anchor point.

The threshold learning module may learn the boundaries between control regimes within the state-action space of the state-action map using at least one of the received sensor inputs, control regime classifications of the regime classifier, anchor points of the state-action map, and feedback of the modified commands issued by the control arbiter.

Another aspect of the disclosure provides a method of learning a robot controller of a robot. The method includes receiving sensor inputs from a sensor system of the robot, determining a control regime of the robot within a control space of a state-action map based on the received sensor inputs, and determining control parameters for exploratory commands based on the received sensor inputs and determined control regime. The method further includes issuing exploratory commands to a control arbiter of the robot controller based on the control parameters. The control arbiter modifies the exploratory commands based on received control limits. The method includes receiving feedback from the control arbiter of executed modified commands for determining the control parameters.

In some implementations, the method includes determining the control limits based on at least one of the received sensor inputs and the received feedback of the executed modified commands. The method may include determining the control parameters based on received sensor inputs and received feedback of executed modified commands. In some examples, the control parameters are determined to cause issuance of exploratory commands that alter a control state of the robot toward a desired control regime, e.g., a control regime having a regime score above a first threshold value or away from a control regime having a regime score below a second threshold value. The first and second threshold values may be equal or different.

The state-action map may include control regimes arranged contiguously with boundaries therebetween. Each control regime provides a space of possible robot states and robot actions in a corresponding control space. The method may include receiving one or more anchor points corresponding to the state-action map and determining the control regime of the robot using the one or more anchor points. Each anchor point is associated with a control regime and defines a point in control space. Determining the control regime of the robot may depend on whether the current robot state and action values are closer to an anchor point than previously observed state-action pairs that have been observed to be within the corresponding control regime for the anchor point. Additionally or alternatively, the determining the control regime may include determining a proximity of a current robot state and robot action with respect to the one or more anchor map points using the received sensor inputs. The method may include learning the boundaries between control regimes within the state-action space of the state-action map using at least one of the received sensor inputs, determined control regime(s) (e.g., classifications of the regime classifier), anchor points of the state-action map, and feedback of the modified commands issued by the control arbiter.

In yet another aspect, a computer program product encoded on a computer readable storage medium including instructions that when executed by a data processing apparatus cause the data processing apparatus to perform operations that include receiving sensor inputs from a sensor system of the robot, determining a control regime of the robot within a control space of a state-action map based on the received sensor inputs, and determining control parameters for exploratory commands based on the received sensor inputs and determined control regime. The operations further include issuing exploratory commands to a control arbiter of the robot controller based on the control parameters. The control arbiter modifies the exploratory commands based on received control limits. The operations include receiving feedback from the control arbiter of executed modified commands for determining the control parameters.

In some implementations, the operations include determining the control limits based on at least one of the received sensor inputs and the received feedback of the executed modified commands. The operations may include determining the control parameters based on received sensor inputs and received feedback of executed modified commands. In some examples, the control parameters are determined to cause issuance of exploratory commands that alter a control state of the robot toward a desired control regime. e.g., a control regime having a regime score above a first threshold value or away from a control regime having a regime score below a second threshold value. The first and second threshold values may be equal or different.

The state-action map may include control regimes arranged contiguously with boundaries therebetween. Each control regime provides a space of possible robot states and robot actions in a corresponding control space. The operations may include receiving one or more anchor points corresponding to the state-action map and determining the control regime of the robot using the one or more anchor points. Each anchor point is associated with a control regime and defines a point in control space. Determining the control regime of the robot may depend on whether the current robot state and action values are closer to an anchor point than previously observed state-action pairs that have been observed to be within the corresponding control regime for the anchor point. Determining the control regime may include determining a proximity of a current robot state and robot action with respect to the one or more anchor map points using the received sensor inputs. The operations may include learning the boundaries between control regimes within the state-action space of the state-action map using at least one of the received sensor inputs, determined control regime(s) (e.g., classifications of the regime classifier), anchor points of the state-action map, and feedback of the modified commands issued by the control arbiter.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Mobile robots having semi-autonomous or autonomous capabilities may execute behaviors one or more computing processors to perform certain tasks or operations, such as navigation and obstacle avoidance. A mobile robot executing a navigation behavior may react in one of several ways in a given situation due to a perceived local perception of its surroundings based on one or more sensor signals from a sensor system. Moreover, the robot may adaptively learn to react in one particular way over another for a given local perception of its surroundings based on past experiences. A threshold learning system can be used to learn a robot controller and the behaviors executed thereon.

FIGS. 1-4 illustrate an exemplary mobile robotic vehicle or robot 100 that may employ dynamic learning of control behaviors in real time for enhanced performance. Although the robot 100 shown includes a track driven drive system having flippers, other mobility platforms, configurations and morphologies are possible as well, such as wheel driven platforms, crawling or walking platforms, etc. The robot 100 can be designed to move about in a variety of environments, including an urban environment of buildings (including staircases), streets, underground tunnels, building ruble, and in vegetation, such as through grass and around trees. The robot 100 may have a variety of features which provide robust operation in these environments, including impact resistance, tolerance of debris entrainment, and invertible operability.

Examples of various tracked robotic vehicles or robots are shown and described in U.S. Pat. Nos. 6,431,296, 6,263,989, 6,668,951 and 6,651,885. The disclosures of these patents are considered part of the disclosure of this application and are hereby incorporated by reference in their entireties. The aforementioned patents describe the construction of various tracked robotic vehicles having driven flippers and articulated robotic components.

Referring to FIG. 1-4, the robot 100 includes a main body 110 (or chassis) having a drive system 115 supported by the main body 110. The main body 110 has right and left sides 110a, 110b as well as a leading end 110c, a trailing end 110d and a center of gravity $CG_M$. In the example shown, the main body 110 includes right and left rigid side plates 112a, 112b disposed parallel to each other. At least one transverse support 114 rigidly couples the right side place 112a to the left side plate 112b. An articulator shaft 116 at the leading end 110c of the main body provides additional transverse support between the right and left side plates 112a, 112b. The rigid components are designed for strength and low weight and can be made from a material such as 7075-T6 aluminum. Alternative versions of the robot 100 can use other materials, such as other lightweight metals, polymers, or composite materials. The robot 100 may be electrically powered (e.g. by a bank of standard military BB-2590 replaceable and rechargeable lithium-ion batteries).

In some implementations, the drive system 115 includes right and left driven track assemblies 120a, 120b (also referred to as the main tracks 120) mounted on the corresponding right and left sides 110a, 110b of the main body 110 and having right and left driven tracks 122a, 122b respectively. Each driven track 122a, 122b is trained about a corresponding front wheel, 124a, 124b, which rotates about a drive axis 15. Although the robot 100 is depicted as having skid steer driven tracks, other drive systems are possible as well, such as differentially driven wheels, articulated legs, etc.

Figure 1:
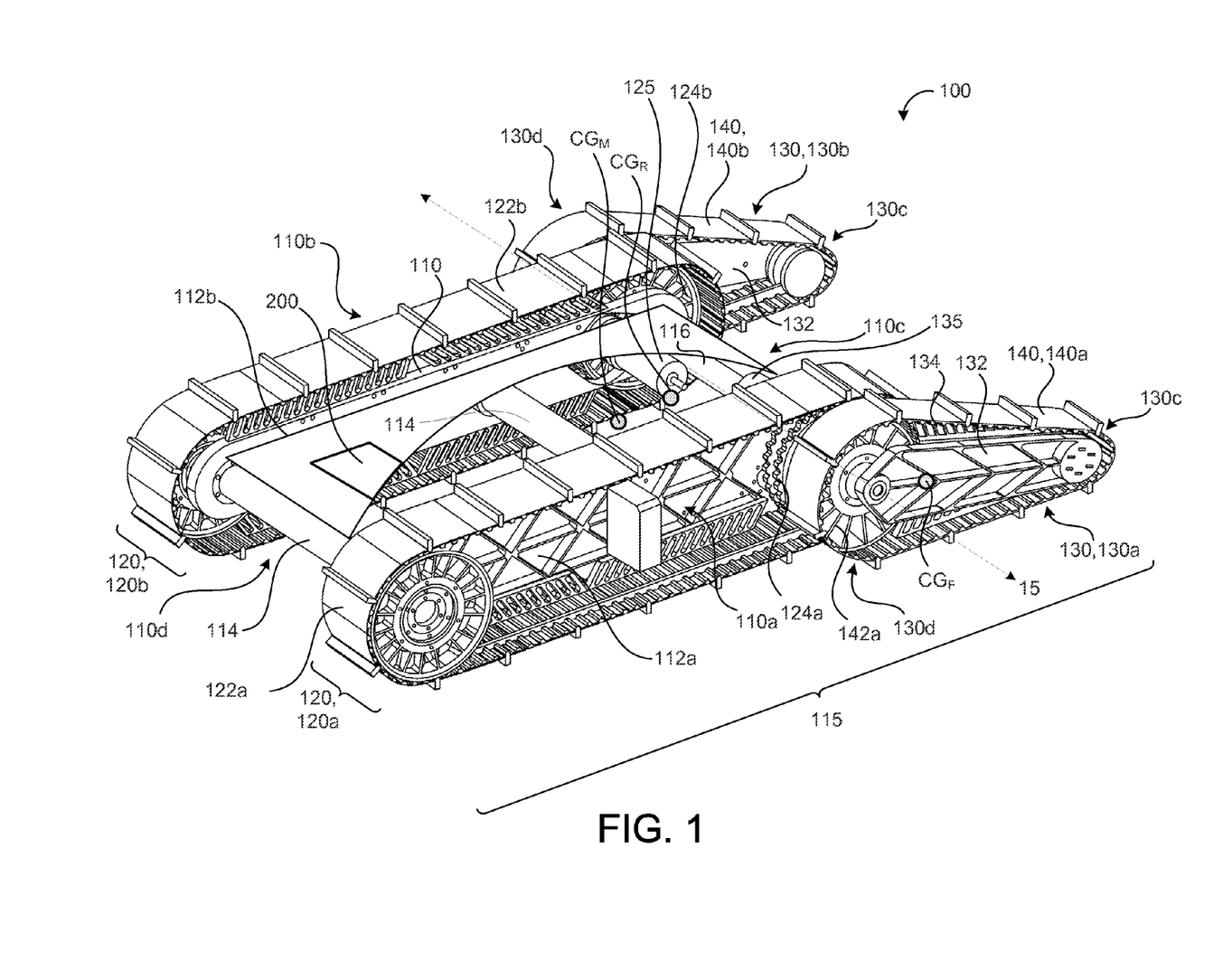
FIG. 1 is a rear perspective view of an exemplary robot.
Figure 2:
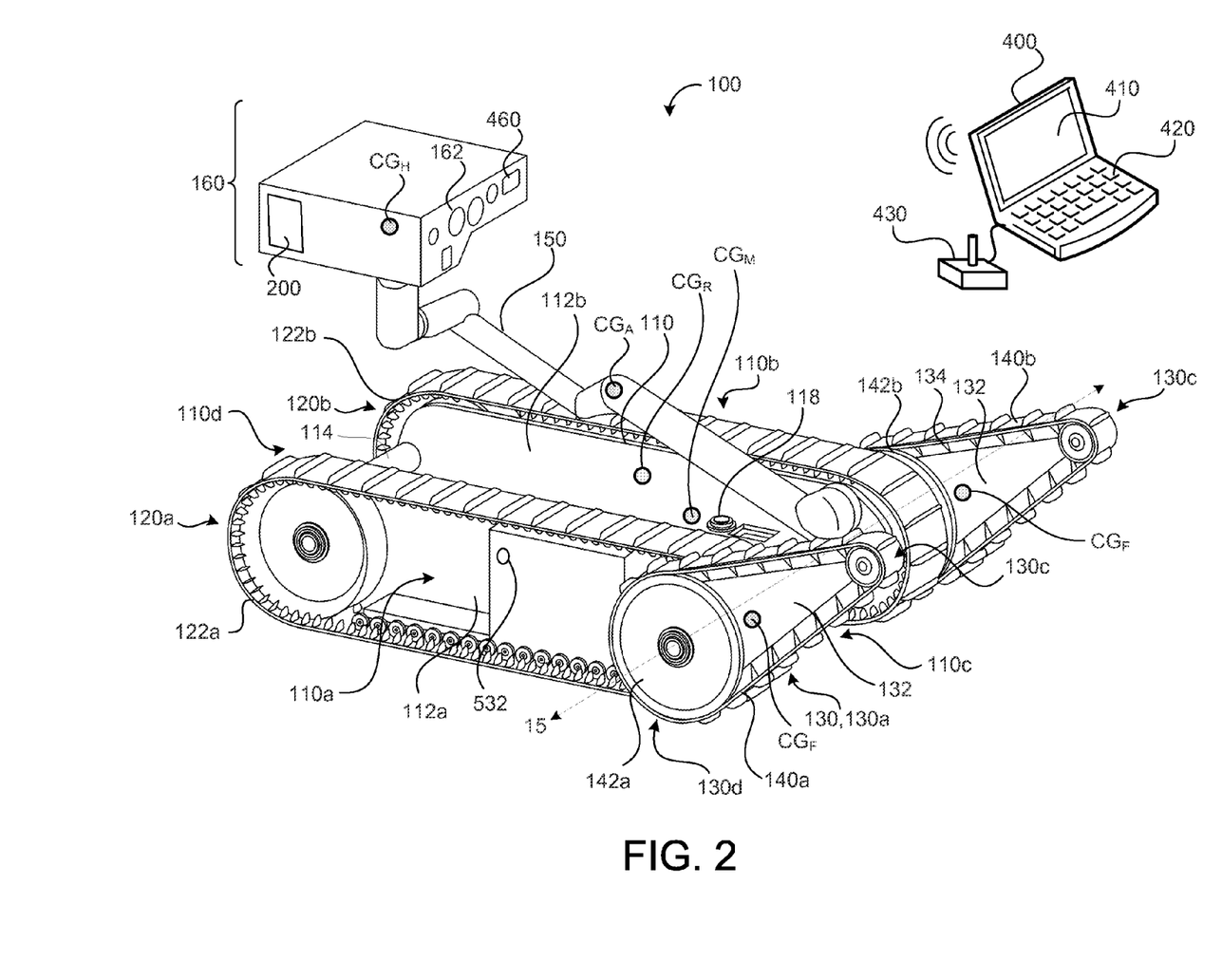
FIG. 2 is a front perspective view of an exemplary robot.

In the examples shown in FIGS. 1 and 2, the robot 100 includes at least one extendable flipper 130 mounted on the main body 110. In the examples shown in FIGS. 3 and 4, the robot 100 is depicted without any flippers 130, but may be configured to releasable receive one or more flippers 130 onto the main body 110 (e.g., onto and concentric with one of the front drive wheels 124a, 124b at the leading end 110c of the main body 110). Referring again to FIGS. 1 and 2, the robot 100 includes right and left flippers 130a, 130b, which are shown in a fully extended configuration extending beyond the front or leading end 110c of the main body 110. The flippers 130, 130a, 130b each have a distal end 130c, a pivot end 130d, and a flipper center of gravity $CG_F$ between the distal and pivot ends 130c, 130d. Each flipper 130, 130a, 130b pivots about a drive axis 15 near the leading end 110c of the main body 110. Moreover, each flipper 130, 130a, 130b may have a driven flipper track 140, 140a, 140b trained about flipper drive wheel 142a, 142b, which is driven about the drive axis 15 at the pivot end 130d of the flipper 130a, 130b. In the example shown, flipper track supports 134 disposed on a flipper side plate 132 of the flipper 130 support the corresponding flipper track 140. In some implementations, the flippers 130, 130a, 130b can be rotated in unison in a continuous 360 degrees between a stowed position, in which the flippers 130a, 130b are next to the right and left side plates 112a, 112b of the main body 110, and at least one deployed position, in which the flippers 130a, 130b are pivoted at an angle with respect to the main tracks 122a, 122b. The center of gravity $CG_R$ of the robot 100 can be contained within an envelope of the 360 degree rotation of the flippers 130a, 130b.

In some implementations, the flipper side plates 132 of the respective right and left flippers 130a, 130b are rigidly coupled to one another through the articulator shaft 116 to move together in unison. In other implementations, the flippers 130a, 130b pivot independently of each other. The combination of main tracks assemblies 120a, 120b and flippers 130, 130a, 130b provide an extendable drive base length to negotiate gaps in a supporting surface. In some examples, the right main tack 122a and the right flipper track 140a are driven in unison and the left main tack 122b and the left flipper track 140b are driven in unison to provide a skid steer drive system.

In the example shown in FIG. 2, the main body 110 includes one or more cameras 118, 119 disposed near the leading end 110c of the main body 110 and may be positioned to have a field of view directed forward and/or upward. The robot 100 may include one or more arms 150 (e.g., articulated arms) each having a pivot end 150c pivotally coupled to the main body 110 and a distal end 150d that may be configured to receive a head 160 or a gripper 170. In the example shown in FIG. 2, the robot includes one arm 150 having a head 160 (e.g., a sensor head) mounted at the distal end 150d of the arm 150. The arm 150 has an arm center of gravity $CG_A$ and the head 160 has a center of gravity $CG_H$. The head 160 may include a camera 162 (e.g., visible light and/or infrared camera), radar, LIDAR (Light Detection And Ranging, which can entail optical remote sensing that measures properties of scattered light to find range and/or other information of a distant target), LADAR (Laser Detection and Ranging), a communication device (radio frequency, wireless, etc.), and/or other components.

Figure 3:
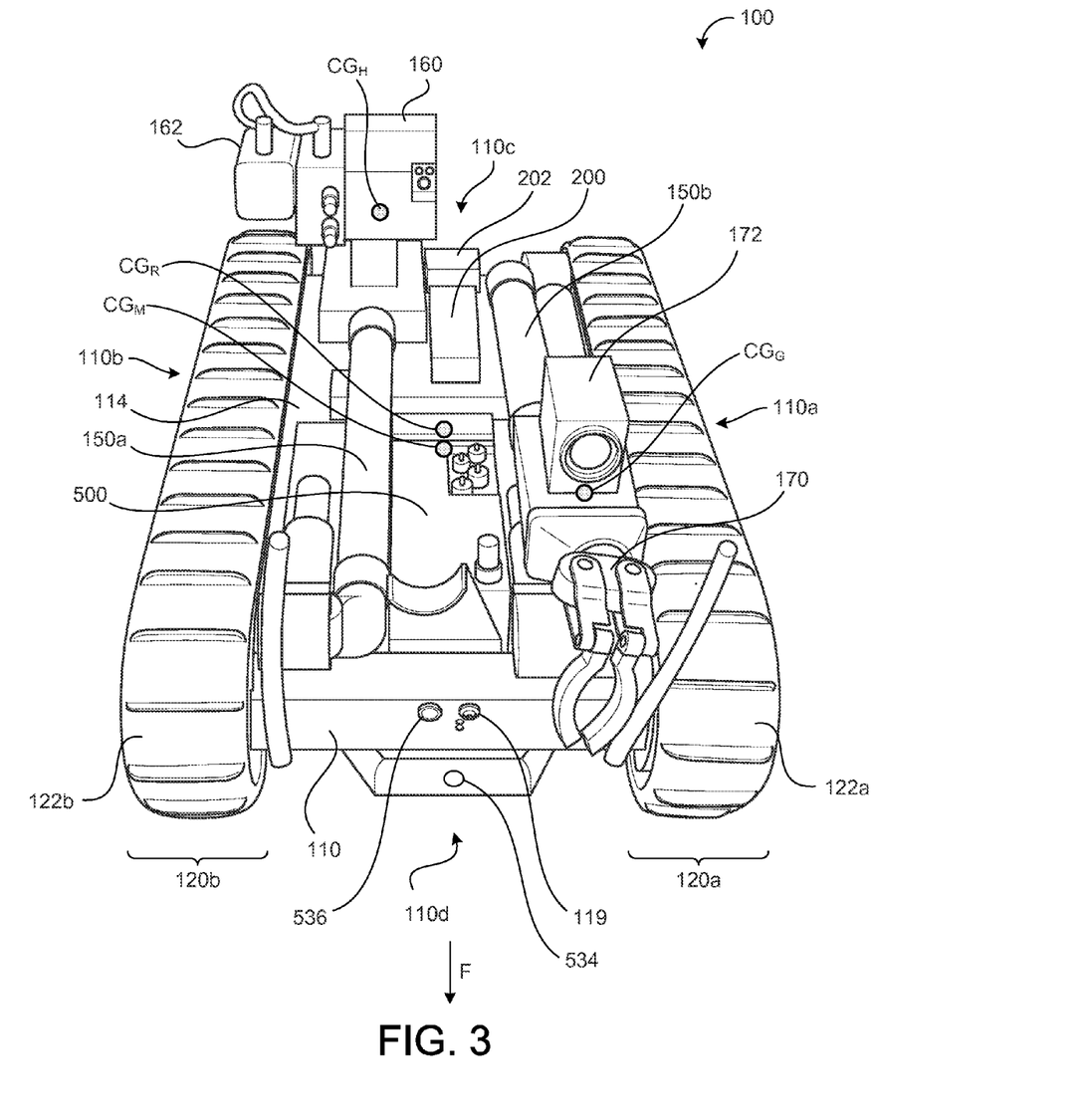
FIG. 3 is a rear view of an exemplary robot.
Figure 4:
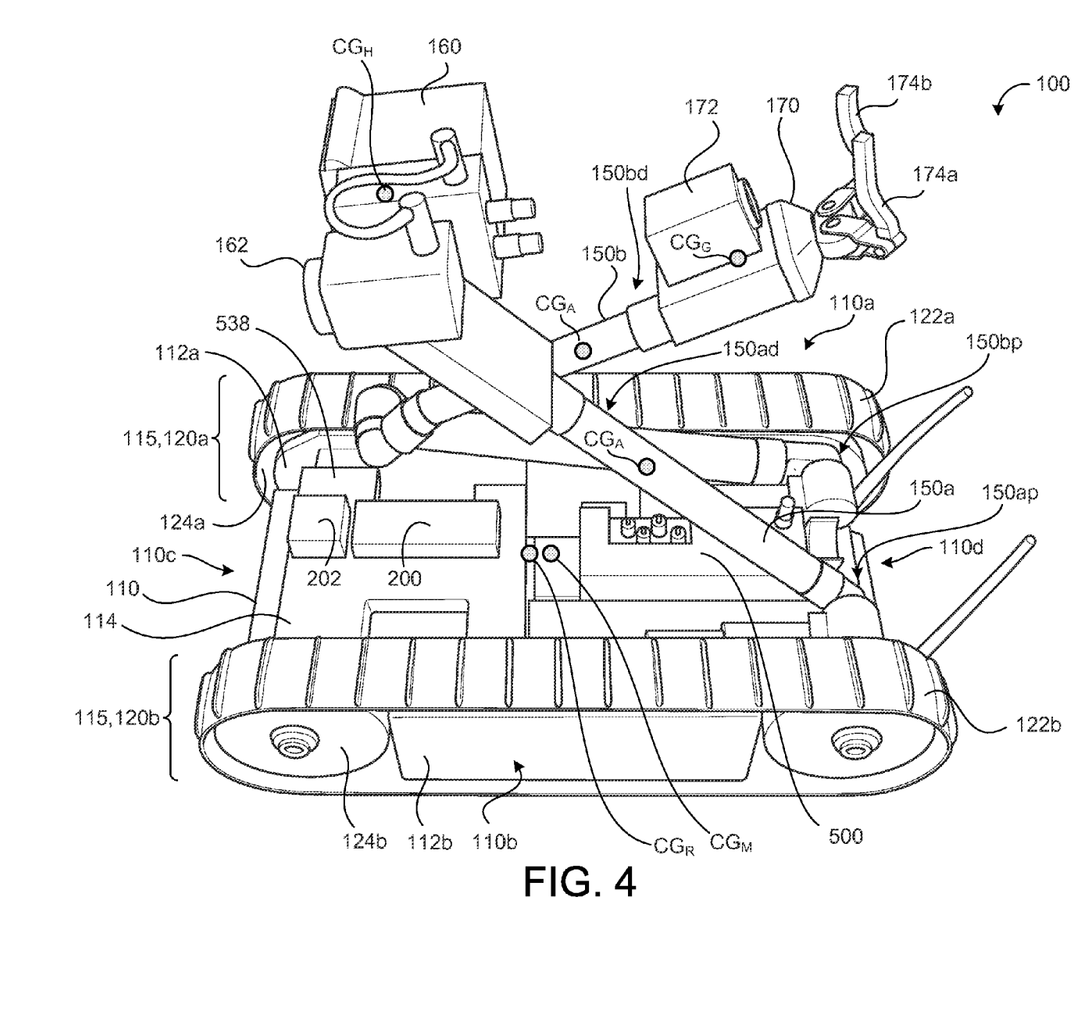
FIG. 4 is a side perspective view of an exemplary robot.

In the examples shown in FIGS. 3 and 4, the robot 100 includes first and second arms 150a, 150b each having a pivot end 150ap, 150bp pivotally coupled to the main body 110. Both arms 150a, 150b may be attached at a common location or region of the main body 110, such as the leading end 110c or the trailing end 110d (as shown) of the main body 110, the arms 150a, 150b can be disposed at opposite ends of the main body 110 as well. For example, the pivot end 150ap of the first arm 150a can be attached near the trailing end 110d of the main body 110 and the pivot end 150bp of the second arm 150b can be attached near the leading end 110c of the main body 110. The arms 150a, 150b may be coupled to the main body 110 in a manner that allows the arms 150a, 150b to be stowed along the main body 110 in a compact configuration and pivot in opposite directions away from main body 110 to allow a wider range of CG-shifting, for example, to negotiate obstacles. A head 160 is mounted on the distal end 150ad of the first arm 150a and a gripper 170 is mounted on the distal end 150bd of the second arm 150b. In the example shown, the gripper 170 includes a gripper camera 172 and first and second opposing fingers or tongs 174a, 174b for grasping objects.

In some implementations, the robot 100 includes a controller 200 in communication with the drive system 115 and any arm(s) 150, 150a, 150b and head(s) 160 or gripper(s) 170 mounted on the arm(s) 150, 150a, 150b. The controller 200 may issue drive commands to one or more motors 125 driving the main tracks 120 and the flipper tracks 140. Moreover, the controller 200 may issue rotational commands a flipper motor 135 to rotate the flippers 130 about the drive axis 15. The controller 200 may include one or more computer processors and associated memory systems.

Referring again to FIG. 2, the controller 200 of the robot 100 may include a communication system 202, which includes, for example, a radio to communicate with a remote operator control unit (OCU) 400 to receive commands and issue status and/or navigation information. The OCU 400 may include a display (e.g., LCD or touch screen) 410, a keyboard 420, and one or more auxiliary user inputs 430, such as a joystick or gaming unit. The OCU 400 allows an operator or user to control the robot 100 from a distance. In some examples, the user can select different levels of human control over the robot 100, ranging from a teleoperation mode, in which the user directly controls the motors and actuators on the robot 100, to autonomous operation, in which the user passes higher-level commands to the robot 100. In partially autonomous operation, the robot 100 can perform tasks such as following a perimeter or wall, recovering from getting stuck in an opening or due to high centering on an obstruction, evading a moving object, or seeking light.

Threshold learning is a method of learning control behaviors for robotic systems. Threshold learning can be dynamic for real time learning to quickly learn how to control the robot 100 to interact in complex ways with its environment and/or control behaviors can be learned by a remote system and provided to the robot 100.

Figure 5:
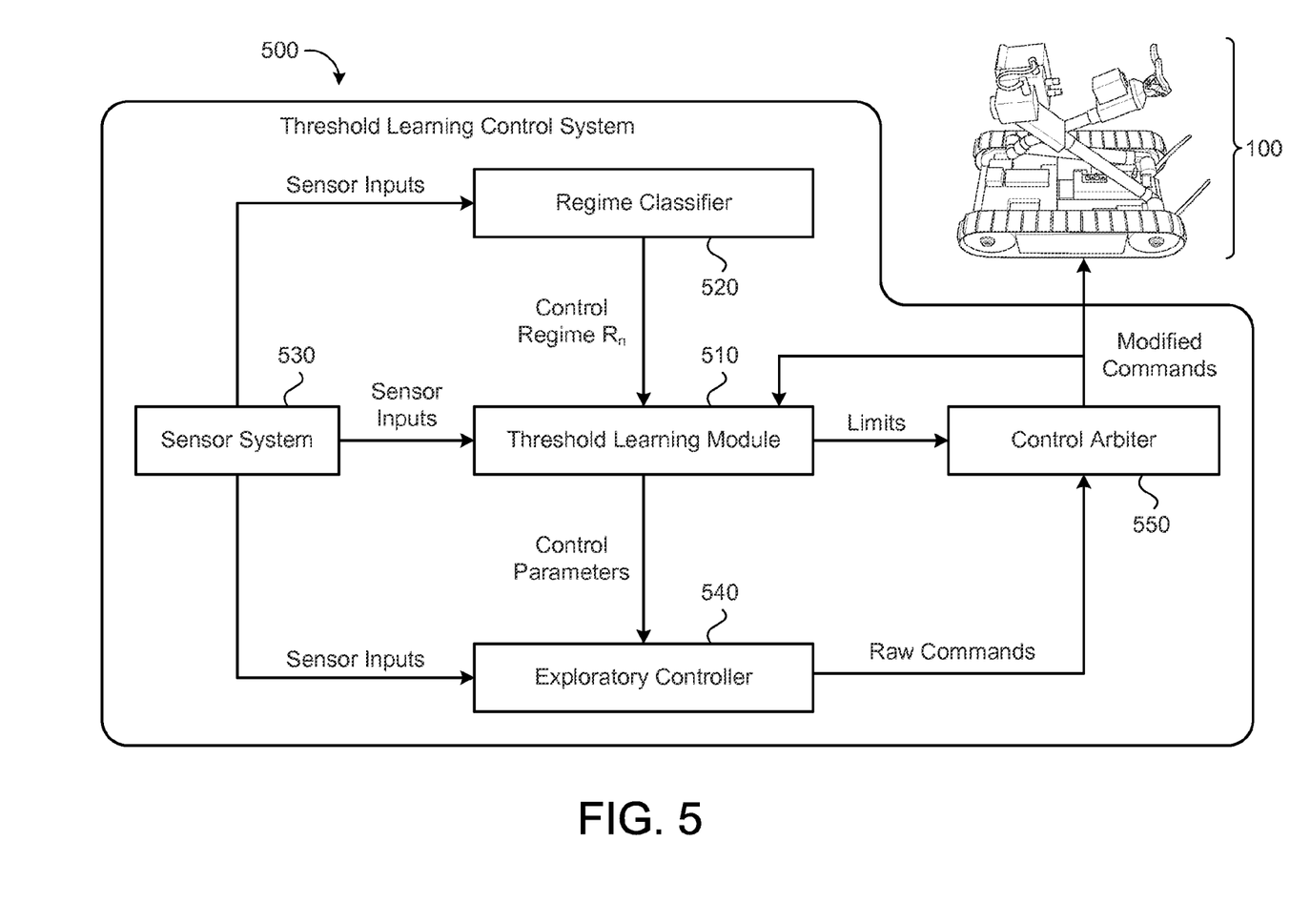
FIG. 5 is a schematic view of an exemplary threshold learning system for learning a robot controller.
Figure 6A:
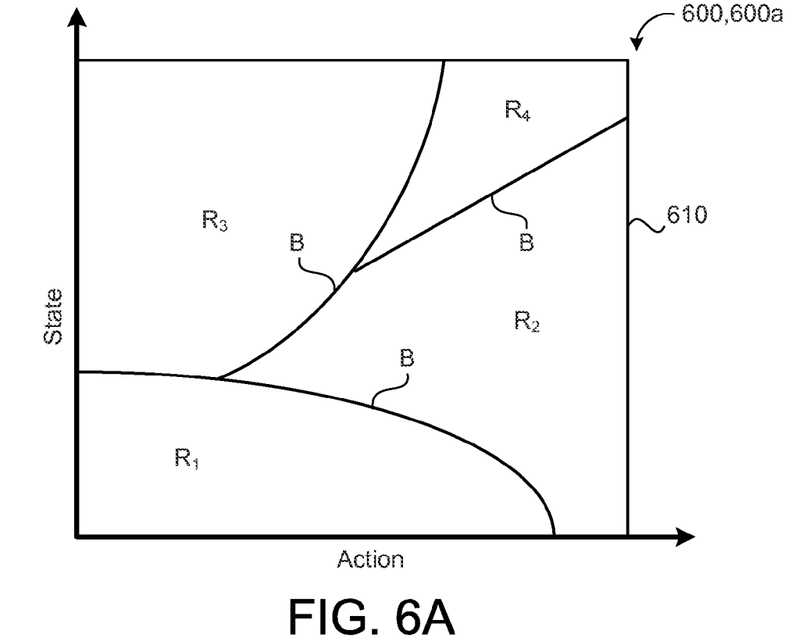
FIGS. 6A-6C are schematic views of exemplary state-action maps.

Referring to FIGS. 5 and 6A, in some implementations, a threshold learning control system 500 includes a threshold learning module 510 in communication with a regime classifier 520, a sensor system 530, an exploratory controller 540, and a control arbiter 550. Threshold learning can be based upon model transition control (MTC), a framework for modeling non-linear control problems that include linear control regimes linked by non-linear transitions. Model transition control may use a state-action map 600 to represent the non-linear control space as a set of contiguous regions in a space of possible robot states and robot actions. FIG. 6A provides an exemplary state-action map 600, 600a for the robot 100 that includes multiple control regimes $R_1$-$R_n$ arranged contiguously and separated by boundaries B (e.g., linear and non-linear transitions), such that a control state of the robot 100 can move from one control regime $R_n$ to another along a specific sequence of control regimes $R_n$. In the example shown, the control state of the robot 100 can move from a first control regime $R_1$ to a second control regime R2 and from the second control regime $R_2$ to a fourth control regime $R_4$. From the fourth control regime $R_4$, the control state can return to the first control regime $R_1$ by passing through a third control regime $R_3$, rather than the second control regime $R_2$.

The controller 200 and/or the regime classifier 520 may receive one or more state-action maps 600 from a remote device and/or generate the state-action map(s) 600 based on observed experiences. The regime classifier 520 identifies a current control regime $R_n$ based on sensor inputs from the sensor system 530. The sensor system 530 provides the controller 200 with sensory feedback (e.g., sensor signals) to determine a local perception of its environment. The quality and quantity of sensory data can vary based on robot usage and purpose.

Learning behaviors (i.e., robot control behaviors) using the threshold learning module 510 allows the robot 100 to stay within desired control regimes $R_n$, while avoiding undesirable control regimes $R_n$. The control regimes $R_n$ may have a regime score (e.g., updated by the threshold learning module 510), where a regime score above a first threshold value indicates desirability and a regime score below a second threshold value indicates undesirability. In some examples, the first and second threshold values are equal, while in other examples, a neutral range exists therebetween. The exploratory controller 540 generates commands or control outputs based on sensor inputs from the sensor system 530 with the goal of exploring a state-action space of the robot 100. The threshold learning module 510 learns the transitions or boundaries B between control regimes $R_n$ based on observed actions executed by the controller 200 and the resulting control regimes $R_n$ experienced by the robot 100. The threshold learning module 510 issues control parameters to the exploratory controller 540 to modify the behavior of the exploratory controller 540, for example, to stay within desired control regimes $R_n$, which can be set by an operator, received from a remote device, and/or determined dynamically by the threshold learning module 510.

In some examples, the threshold learning module 510 sets limits on command outputs of the exploratory controller 540 as a function of the sensor inputs of the sensor system 530. The control arbiter 550 applies control limits from threshold learning module 510 to the command outputs of the exploratory controller 540.

Referring again to FIGS. 1-4, to achieve reliable and robust autonomous or semi-autonomous movement, the sensor system 530 may include several different types of sensors which can be used in conjunction with one another to create a perception of the robot's environment sufficient to allow the robot 100 to make intelligent decisions about actions to take in that environment. The sensor system 530 may include one or more types of sensors supported by the robot body 110, which may include obstacle detection obstacle avoidance (ODOA) sensors, communication sensors, navigation sensors, etc. For example, these sensors may include, but not limited to, proximity sensors, contact sensors, a camera 118, 162, 172 (e.g., volumetric point cloud imaging, three-dimensional (3D) imaging or depth map sensors, visible light camera and/or infrared camera), sonar, radar, LIDAR (Light Detection And Ranging, which can entail optical remote sensing that measures properties of scattered light to find range and/or other information of a distant target), LADAR (Laser Detection and Ranging), etc. In some implementations, the sensor system 530 includes ranging sonar sensors, proximity cliff detectors, contact sensors, a laser scanner, and/or an imaging sonar 460.

There are several challenges involved in placing sensors on a robotic platform. First, the sensors need to be placed such that they have maximum coverage of areas of interest around the robot 100. Second, the sensors may need to be placed in such a way that the robot 100 itself causes an absolute minimum of occlusion to the sensors; in essence, the sensors cannot be placed such that they are "blinded" by the robot itself. Third, the placement and mounting of the sensors should not be intrusive to the rest of the industrial design of the platform. In terms of aesthetics, it can be assumed that a robot with sensors mounted inconspicuously is more "attractive" than otherwise. In terms of utility, sensors should be mounted in a manner so as not to interfere with normal robot operation (snagging on obstacles, etc.).

In some implementations, the sensor system 530 includes one or more proximity sensors 532 in communication with the controller 200 and arranged in one or more zones or portions of the robot 100 (e.g., disposed around a perimeter of the main body 110) for detecting any nearby or intruding obstacles. The proximity sensors may be converging infrared (IR) emitter-sensor elements, sonar sensors, ultrasonic sensors, and/or imaging sensors (e.g., 3D depth map image sensors) that provide a signal to the controller 200 when an object is within a given range of the robot 100. Moreover, one or more of the proximity sensors 532 can be arranged to detect when the robot 100 has encountered a falling edge of the floor, such as when it encounters a set of stairs. For example, a cliff proximity sensors 532 can be located at or near the leading end 110c and the trailing end 110d of the main body 110. The controller 200 (executing a control system) may execute behaviors that cause the robot 100 to take an action, such as changing its direction of travel, when an edge is detected. In some cases, cliff sensing is implemented using infrared (IR) proximity or actual range sensing, using an infrared emitter and an infrared detector angled toward each other so as to have an overlapping emission and detection fields, and hence a detection zone, at a location where a floor should be expected. IR proximity sensing can have a relatively narrow field of view, may depend on surface albedo for reliability, and can have varying range accuracy from surface to surface. As a result, multiple discrete sensors can be placed about the perimeter of the robot 100 to adequately detect cliffs from multiple points on the robot 100. Moreover, IR proximity based sensors typically cannot discriminate between a cliff and a safe event, such as just after the robot 100 climbs a threshold.

The proximity sensors 532 may function alone, or as an alternative, may function in combination with one or more contact sensors 534 (e.g., bump switches) for redundancy. For example, one or more contact or bump sensors 534 on the robot body 110 can detect if the robot 100 physically encounters an obstacle. Such sensors may use a physical property such as capacitance or physical displacement within the robot 100 to determine when it has encountered an obstacle The sensor system 530 may include a laser scanner 536 mounted on a forward portion of the robot body 110 and in communication with the controller 200. In the examples shown, the laser scanner 536 is mounted on the main body 110 facing forward (e.g., having a field of view along the forward drive direction F). The laser scanner 536 scans an area about the robot 100 and the controller 200, using signals received from the laser scanner 536, may create an environment map or object map of the scanned area. The controller 200 may use the object map for navigation, obstacle detection, and obstacle avoidance. Moreover, the controller 200 may use sensory inputs from other sensors of the sensor system 530 for creating object map and/or for navigation.

In some examples, the laser scanner 536 is a scanning LIDAR, which may use a laser that quickly scans an area in one dimension, as a "main" scan line, and a time-of-flight imaging element that uses a phase difference or similar technique to assign a depth to each pixel generated in the line (returning a two dimensional depth line in the plane of scanning). In order to generate a three dimensional map, the LIDAR can perform an "auxiliary" scan in a second direction (for example, by "nodding" the scanner). This mechanical scanning technique can be complemented, if not supplemented, by technologies such as the "Flash" LIDAR/LADAR and "Swiss Ranger" type focal plane imaging element sensors, techniques which use semiconductor stacks to permit time of flight calculations for a full 2-D matrix of pixels to provide a depth at each pixel, or even a series of depths at each pixel (with an encoded illuminator or illuminating laser).

The sensor system 530 may include one or more three-dimensional (3-D) image sensors in communication with the controller 200. In the example shown, any of the cameras 118, 119, 162, 172 can be more three-dimensional (3-D) image sensors. If the 3-D image sensor has a limited field of view, the controller 200 or the sensor system 530 can actuate the 3-D image sensor in a side-to-side scanning manner to create a relatively wider field of view to perform robust ODOA.

In some examples, the sensor system 530 includes an inertial measurement unit (IMU) 538 in communication with the controller 200 to measure and monitor a moment of inertia of the robot 100 with respect to the overall center of gravity $CG_R$ of the robot 100. The controller 200 may monitor any deviation in feedback from the IMU 538 from a threshold signal corresponding to normal unencumbered operation. For example, if the robot begins to pitch away from an upright position, it may be "clothes lined" or otherwise impeded, or someone may have suddenly added a heavy payload. In these instances, it may be necessary to take urgent action (including, but not limited to, evasive maneuvers, recalibration, and/or issuing an audio/visual warning) in order to assure safe operation of the robot 100.

When accelerating from a stop, the controller 200 may take into account a moment of inertia of the robot 100 from its overall center of gravity $CG_R$ to prevent robot tipping. The controller 200 may use a model of its pose, including its current moment of inertia. When payloads are supported, the controller 200 may measure a load impact on the overall center of gravity $CG_R$ and monitor movement of the robot moment of inertia. If this is not possible, the controller 200 may apply a test torque command to the drive system 115 and measure actual linear and angular acceleration of the robot using the IMU 538, in order to experimentally determine safe limits.

Figure 6B:
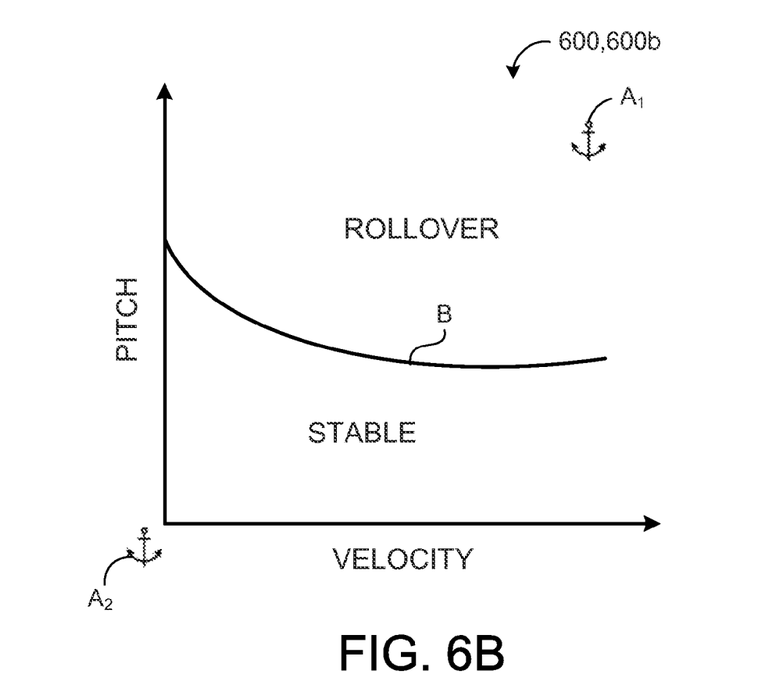
Figure 6C:
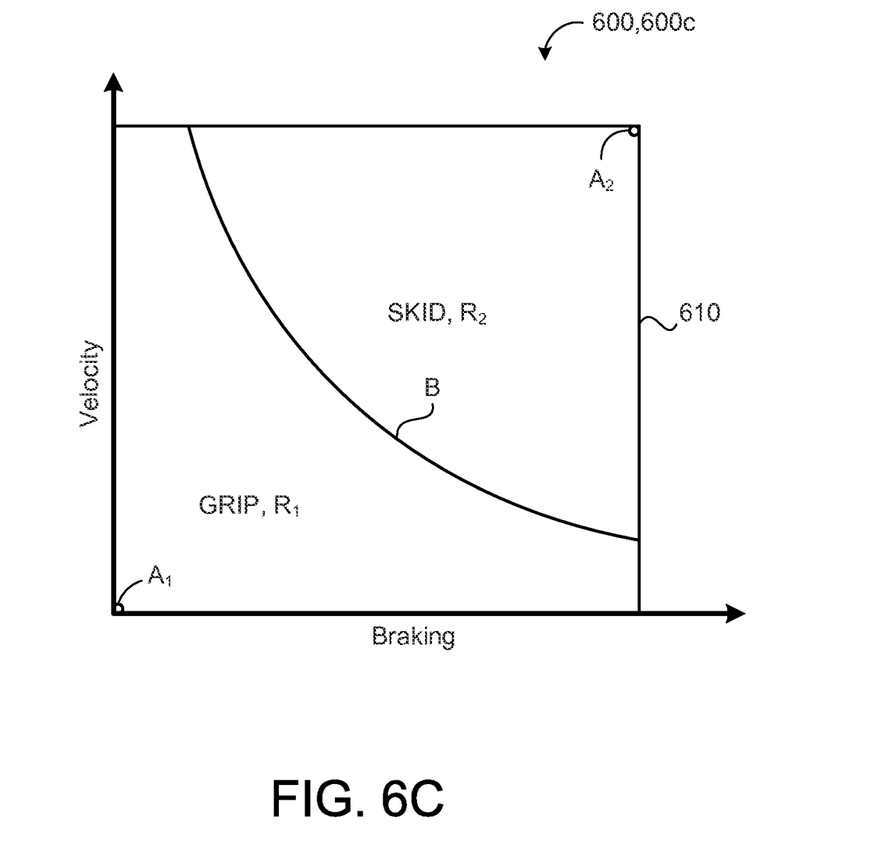

Referring to FIGS. 5-6C, the threshold learning module 510 can use multiple state-action maps 600 for different control situations (e.g., state-action maps 600 specific to certain control regimes $R_n$). For example, FIG. 6B illustrates a state-action map 600b for the robot 100 braking while driving. This state-action map 600 includes control regimes $R_n$ for braking with no tire or tread slip (a GRIP regime, $R_1$) and for braking after the vehicle has started to skid (a SKID regime, $R_2$). If the robot 100 is moving slowly or applying a limited braking effort, it is likely to remain in the GRIP regime. If the robot 100 is moving quickly and braking hard, it is likely to enter the SKID regime. The threshold learning module 510, regime classifier 520, and the exploratory controller 540 may each receive sensor inputs from the sensor system 530. Using the state-action map 600b as well as a velocity input and a braking level from the sensor system 530, the regime classifier 520 may determine current control regime $R_n$ of either the GRIP regime, $R_1$ or the SKID regime, $R_2$. Moreover, the regime classifier 520 may provide the threshold learning module 510 with a state locality near or a tendency to move towards the boundary B between the GRIP regime, $R_1$ and the SKID regime, $R_2$. The threshold learning module can then adjust exploratory controller parameters and/or set command limits via the control arbiter 550 to prevent the robot 100 from entering the SKID regime.

FIG. 6B provides a schematic view of an exemplary state-action map 600, 600b. This state-action map 600b includes control regimes for STABLE and ROLLOVER control regimes. The state axis corresponds to the robot's current pitch angle, and the action axis corresponds to the robot's current velocity. The anchor point for the STABLE regime is at zero pitch and zero velocity. The anchor point $A_1$ for the ROLLOVER regime is at maximum pitch and maximum velocity. The regime classifier 520 detects a rollover event using sensor inputs from the sensor system 530. The threshold learning module 510 learns the boundary B between the STABLE regime and the ROLLOVER regime. The threshold learning module 510 also adjusts exploratory controller parameters and/or sets command limits via the control arbiter 550 to prevent the robot 100 from rolling over.

For dynamic threshold learning, the threshold learning module 510 changes the control parameters sent to the exploratory controller 540 in real-time based on the sensor inputs of the sensor system 530. In the example using the state-action map 600c (FIG. 6C) for the robot 100 braking while driving, the threshold learning module 510 can alter the control parameters sent to the exploratory controller 540 to issue commands to the control arbiter 550 that causes the drive system 115 to slow down in response to receiving sensor inputs from the sensor system 530 indicating a drive velocity greater than a threshold velocity, a braking level greater than a threshold braking level and/or a control regime classification of the SKID regime, $R_2$ (or that the control state is approaching the boundary B between the GRIP regime, $R_1$ and the SKID regime, $R_2$). By receiving a control regime classification from the regime classifier 520 that includes a current control regime $R_n$ and/or a location in the current control regime $R_n$, such as near a boundary B, the threshold learning module 510 can predict outcomes of possible or feasible commands and direct the exploratory controller 540 to command the robot 100 to stay within safe or desired control regimes $R_n$.

In another example, if the threshold learning module detects that a certain combination of robot pitch angle and velocity is likely to result in the robot rolling over, it can reduce the robot's velocity as a function of pitch angle, via command limits set at the arbiter. These command limits will keep the robot within the NORMAL control regime and prevent the robot from rolling over.

In another example, if the robot 100 raises its arms 150a, 150b and the threshold learning module 510 receives sensor inputs from the inertial measurement unit 538 for determination of a high-centering of the robot's center of gravity $CG_R$ and/or the regime classifier 520 classifies the robot control state as residing in a control regime $R_n$ corresponding to or approaching a high-centering control regime $R_n$, the threshold learning module 510 can direct the exploratory controller 540 (via control parameters) to issue commands that cause the robot 100 to lower its arms 150A, 150B, moving the robot center of gravity $CG_R$ into a more stable position. To learn the boundaries B between control regimes $R_n$, the threshold learning module 510 may direct the exploratory controller 540 to issue commands that cause the robot control state to approach or even enter undesirable or unstable control regimes $R_n$, such as a high-centering control regime $R_n$.

The threshold learning module 510 may use domain knowledge in the form of anchor points to accelerate learning. An anchor point $A_n$ is a point in a state-action space 610 that most likely results in a corresponding control regime $R_n$. In the example shown in FIG. 6B, an anchor point $A_1$ for the GRIP regime $R_1$ is at zero velocity and zero braking, while an anchor point $A_2$ for the SKID regime $R_2$ is at maximum velocity and maximum braking. For any observed state-action pair and control regime $R_n$, the threshold learning module 310 assumes that all points closer to the corresponding anchor point $A_n$ are within in the same control regime $R_n$. For example, if the robot 100 is driving 50 MPH, braking with 80% effort and skidding, the regime classifier 520 and/or the threshold learning module 310 can assume that the robot 100 would also skid if it were driving faster and/or braking harder. Likewise, if the robot 100 is driving 10 MPH, braking with 50% effort, and NOT skidding, the threshold learning module 310 can assume that the robot 100 would also not skid if it were driving slower and/or braking less. The regime classifier 520 may determine the control regime $R_n$ of the robot 100 by determining whether the current robot state and action values are closer to an anchor point A, than previously observed state-action pairs that have been observed to be within the corresponding control regime for the anchor point $A_n$ using the received sensor inputs. This approach allows the threshold learning module 310 to learn control regime boundaries B within the state-action space from a small number of observations.

The threshold learning system 500 can be used to learn a variety of robot controllers. The exemplary robot 100 shown in FIGS. 1-4 illustrates a skid-steer robot 100; however, the threshold learning system 500 can be used to learn controllers for other types of robots as well, such as wheeled robots, walking robots, etc. For example, the threshold learning system 500 can be used to learn a robot controller of a wheeled platform for determining under-steering and over-steering control regimes in high-speed conditions. For the exemplary tracked robot 100 shown in FIGS. 1-4, the threshold learning system 500 can be used to learn the controller 200 to prevent high-centering of the robot center of gravity $CG_R$ and rollovers. The threshold learning system 500 can provide relatively fast, real-time learning of robot control systems that interact with environments in complex, non-linear ways, and allow the robot controller 200 to quickly adapt to different environments in real-time. Moreover, a generic robot controller can be written once and then applied to different robot platforms using the threshold learning system 500 to learn the specific control parameters for each robot in real-time.

Figure 7:
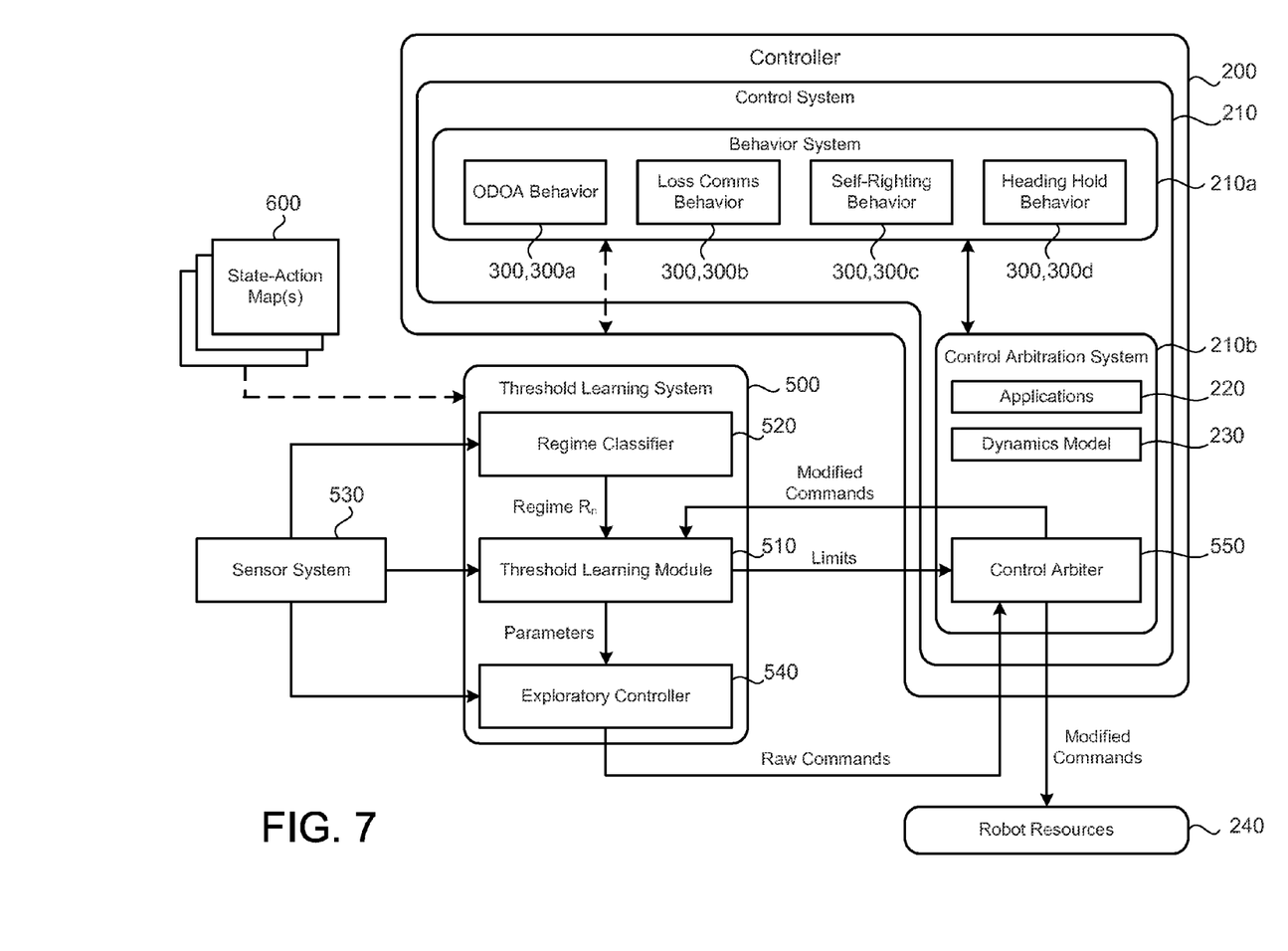
FIG. 7 is a schematic view of an exemplary robot controller in communication with an exemplary threshold learning system.

Referring to FIG. 7, in some implementations, the controller 200 (e.g., a device having one or more computing processors in communication with memory capable of storing instructions executable on the computing processor(s)) executes a control system 210, which includes a behavior system 210a and a control arbitration system 210b in communication with each other. The control arbitration system 210b allows robot applications 220 to be dynamically added and removed from the control system 210, and facilitates allowing applications 220 to each control the robot 100 without needing to know about any other applications 220. In other words, the control arbitration system 210b provides a simple prioritized control mechanism between applications 220 and resources 240 of the robot 100. The control system 210 communicates with the threshold learning system 500.

The applications 220 can be stored in memory of or communicated to the robot 100, to run concurrently on (e.g., on a processor) and simultaneously control the robot 100. The applications 220 may access behaviors 300 of the behavior system 210a. The independently deployed applications 220 are combined dynamically at runtime and to share robot resources 240 (e.g., drive system 115, arm(s) 150, head(s) 160 and/or gripper(s) 170) of the robot 100. A low-level policy is implemented for dynamically sharing the robot resources 240 among the applications 220 at run-time. The policy determines which application 220 has control of the robot resources 240 required by that application 220 (e.g. a priority hierarchy among the applications 220). Applications 220 can start and stop dynamically and run completely independently of each other. The control system 210 also allows for complex behaviors 300 which can be combined together to assist each other.

The control arbitration system 210b includes one or more control arbiters 550 in communication with the threshold learning system 500 and the application(s) 220. The control arbitration system 210b may include components that provides an interface to the control arbitration system 210b for the applications 220. Such components may abstract and encapsulate away the complexities of authentication, distributed resource control arbiters, command buffering, coordinate the prioritization of the applications 220 and the like. The control arbiter 550 receives commands from every application 220 and the exploratory controller 540 of the threshold learning system 500 and generates a single command based on the applications' priorities and publishes it for its associated resources 240. The control arbiter 550 receives state feedback from its associated resources 240 and may send it back up to the applications 220 and/or threshold learning system 500. The robot resources 240 may be a network of functional modules (e.g. actuators, drive systems, and groups thereof) with one or more hardware controllers. The commands of the control arbiter 550 are specific to the resource 240 to carry out specific actions.

A dynamics model 230 executable on the controller 200 is configured to compute the center for gravity (CG), moments of inertia, and cross products of inertial of various portions of the robot 100 for the assessing a current robot state. The dynamics model 230 may be configured to calculate the center of gravity $CG_M$ of the main body 110, the center of gravity $CG_F$ of each flipper 130, the center of gravity $CG_A$ of each arm 150, the center of gravity $CG_H$ of each head 160, and/or the center of gravity $CG_R$ of the entire robot 100. The dynamics model 230 may also model the shapes, weight, and/or moments of inertia of these components. In some examples, the dynamics model 230 communicates with the inertial moment unit (IMU) 538 or portions of one (e.g., accelerometers and/or gyros) in communication with the controller 200 for calculating the various centers of gravities of the robot 100. The dynamics model 230 can be used by the controller 200, along with other programs 220 or behaviors 300 to determine operating envelopes of the robot 100 and its components.

In some implementations, a behavior 300 is a plug-in component that provides a hierarchical, state-full evaluation function that couples sensory feedback from multiple sources, such as the sensor system 530, with a-priori limits and information into evaluation feedback on the allowable actions of the robot 100. Since the behaviors 300 are pluggable into the application 220 (e.g. residing inside or outside of the application 220), they can be removed and added without having to modify the application 220 or any other part of the control system 210. Each behavior 300 is a standalone policy. To make behaviors 300 more powerful, it is possible to attach the output of multiple behaviors 300 together into the input of another so that you can have complex combination functions. The behaviors 300 are intended to implement manageable portions of the total cognizance of the robot 100. In the example shown, the behavior system 210a includes an obstacle detection/obstacle avoidance (ODOA) behavior 300a for determining responsive robot actions based on obstacles perceived by the sensor (e.g., turn away; turn around; stop before the obstacle, etc.). Another behavior 300 may include a loss communications behavior 300b for determining a driven path of the robot 100 during a loss of communication with a satellite for obtaining global positioning coordinates. The driven path can be determined using at least one of the inertial measurement unit 538, odometry, and dead reckoning. A self-right behavior 300c can provide actions for self-righting the robot 100 upon detecting a roll-over. Possible actions include rotating the flippers 130 a continuous 360 degrees to cause the main body to flip 180 degrees. A heading hold behavior 300d provides an assistant behavior that allows the robot 100 correct a heading of the driven robot 100. For example, if the robot 100 hits a rock, obstacle, or course variation while driving in veers off course, the heading hold behavior 300d can automatically correct the heading of the robot 100, allowing the robot 100 to maintain a drive direction issued by the user. Other behaviors are possible as well.

Referring again to FIGS. 1-7, the threshold learning module 510 can issue control parameters to the exploratory controller 540 to learn the control regime boundaries B of various state-action maps 600 associated with various feasible actions offered by the behaviors 300 for execution. By exploring the control space of the state-action map(s) 600, the threshold learning module can learn the behaviors 300 (and optionally their interaction therebetween). For example, using the control system 210, exploratory controller 540 can cause the controller 200 to select an action (or move command) for each robotic component (e.g., motor or actuator) from a corresponding action space (e.g., a collection of possible actions or moves for that particular component) to effectuate a coordinated move of each robotic component in a manner that either causes or avoids collisions with itself and any objects about the robot 100, which the robot 100 is aware of, to learn the threshold limits or transitional boundaries B between control regimes $R_n$.

Figure 8:
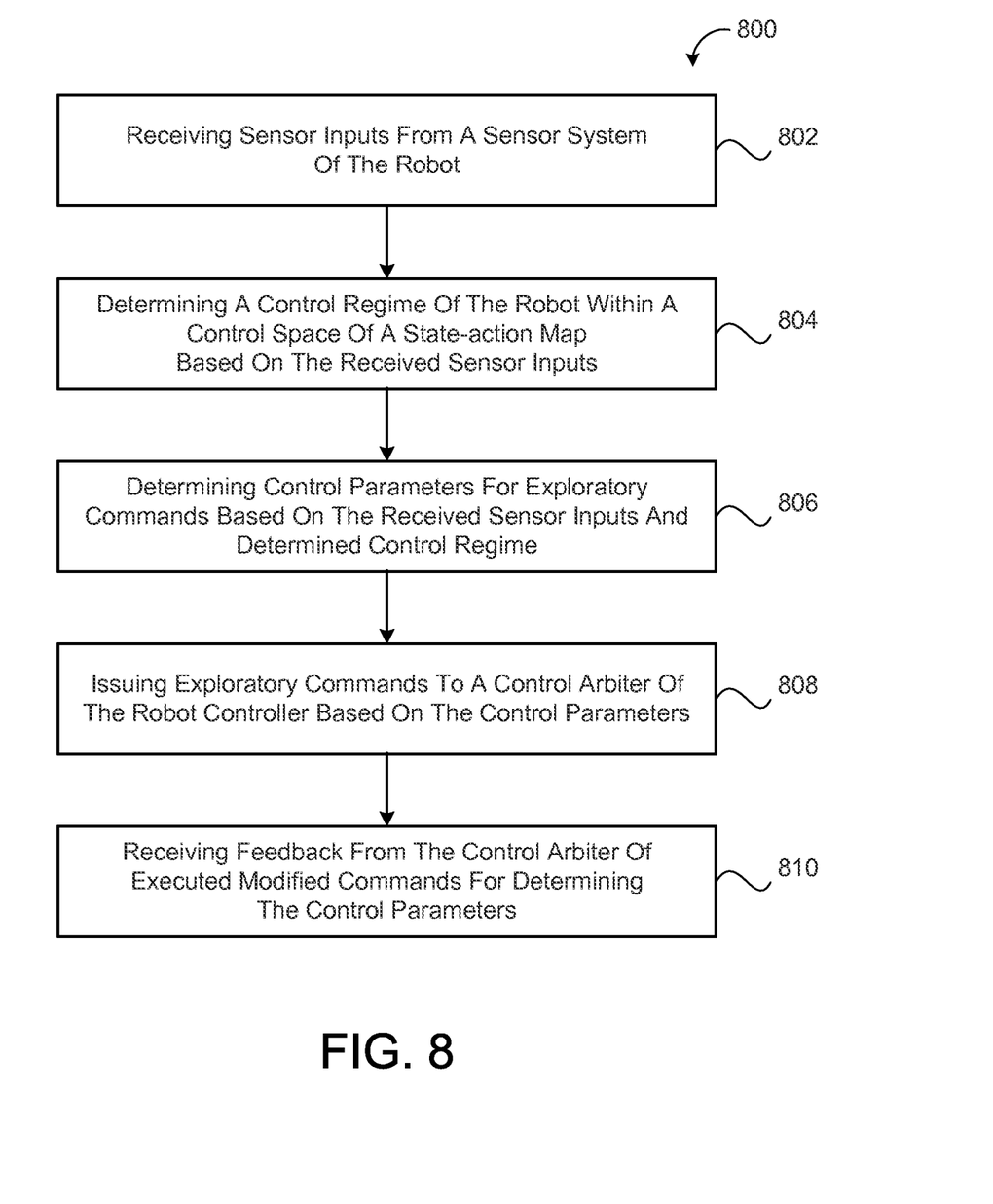
FIG. 8 provides an exemplary arrangement of operations for a method of learning a controller of a robot.

FIG. 8 provides an exemplary arrangement 800 of operations for a method of learning a robot controller 200 of a robot 100. The method includes receiving 802 sensor inputs from a sensor system 530 of the robot 100, determining 804 a control regime $R_n$ of the robot 100 within a control space of a state-action map 600 based on the received sensor inputs, and determining 806 control parameters for exploratory commands based on the received sensor inputs and determined control regime $R_n$. The method further includes issuing 808 exploratory commands to a control arbiter 550 of the robot controller 200 based on the control parameters. The control arbiter 550 modifies the exploratory commands based on received control limits. The method includes receiving 810 feedback from the control arbiter 550 of executed modified commands for determining the control parameters.

In some implementations, the method includes determining the control limits based on at least one of the received sensor inputs and the received feedback of the executed modified commands. For example, the threshold learning module 510 may modify the control limits in real-time based on the control arbiter feedback. Similarly, the method may include determining the control parameters based on received sensor inputs and received feedback of executed modified commands. The threshold learning module 510 may determine the control parameters in real-time based on the sensor inputs and control arbiter feedback with a goal of exploring the control space of the state-action map 600.

If the sensor input and/or control arbiter feedback indicate that the robot 100 is operating in a control regime $R_n$ near a boundary B between a desirable control regime $R_n$ and an undesirable control regime $R_n$, the threshold learning module 510 may issue control parameters that cause the exploratory controller 540 to alter the control state either toward or away from the boundary B, depending an operation goal (e.g., move the control state away from that boundary B for safe operation or move the control state toward that boundary B for determining location of that boundary B). For example, the method may include determining the control parameters (e.g., by the threshold learning module 510) to cause issuance of exploratory commands (e.g., by the exploratory controller 540) that alter a control state of the robot toward a desired control regime, for example, a control regime having a regime score above a first threshold value (e.g., indicating a favorable or desirable control regime $R_n$) or away from a control regime having a regime score below a second threshold value (e.g., indicating an unfavorable or undesirable control regime $R_n$). The first and second threshold values may be equal or different. When the first and second threshold values are not equal, a neutral range exists therebetween.

The method may include receiving a state-action map 600 (FIG. 6A) that includes control regimes $R_n$ arranged contiguously with boundaries B therebetween. Each control regime $R_n$ provides a space of possible robot states and robot actions in a corresponding control space. The method may include receiving one or more anchor points $A_n$ corresponding to the state-action map 600 and determining the control regime $R_n$ of the robot 100 using the one or more anchor points $A_n$. Each anchor point $A_n$ is associated with a control regime $R_n$ and defines a point in control space.

Determining the control regime $R_n$ of the robot 100 may include determining whether the current robot state and action values are closer to an anchor point $A_n$ than previously observed state-action pairs that have been observed to be within the corresponding control regime for the anchor point $A_n$ using the received sensor inputs. For example, if the current robot state-action pair is within a threshold distance or within a locality of one of the anchor map points $A_n$, the method may include classifying the current control regime $R_n$ as the control regime $R_n$ associated with that anchor map point $A_n$. The method may include learning the boundaries B between control regimes $R_n$ within the state-action space of the state-action map 600 using at least one of the received sensor inputs, control regime classifications (e.g., of the regime classifier 520), anchor points $A_n$ of the state-action map 600, and feedback of the modified commands issued by the control arbiter 550.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A threshold learning control system for learning a robot controller of a robot, the threshold learning control system comprising:
    a threshold learning module executing on a data processing apparatus and receiving sensor inputs from a sensor system of the robot;
    a regime classifier executing on the data processing apparatus and receiving sensor inputs from the sensor system of the robot and determining a control regime based on the received sensor inputs, the regime classifier communicating the control regime to the threshold learning module, the regime classifier receiving at least one state-action map, each state-action map having control regimes arranged contiguously with boundaries therebetween, and each control regime providing a state-action space of possible robot states and robot actions in a corresponding control space;
    an exploratory controller executing on the data processing apparatus and receiving sensor inputs from the sensor system of the robot and control parameters from the threshold learning module; and
    a control arbiter executing on the data processing apparatus and receiving exploratory commands from the exploratory controller and limits from the threshold learning module, the control arbiter issuing modified exploratory commands based on the received limits to the robot controller,
    wherein the threshold learning module learns the boundaries between control regimes within the state-action space of the at least one state-action map using at least one of the received sensor inputs, control regime classifications of the regime classifier, anchor points of the at least one state-action map, and feedback of the modified exploratory commands issued by the control arbiter.

2. The threshold learning control system of claim 1, wherein the threshold learning module sets the limits for the commands issued by the exploratory controller based on the received sensor inputs, the control arbiter modifying the commands received from the exploratory controller based on the limits received from the threshold learning module.

3. The threshold learning control system of claim 1, wherein the threshold learning module issues control parameters to the exploratory controller based on the received sensor inputs and the feedback received from the control arbiter of executed modified exploratory commands.

4. The threshold learning control system of claim 1, wherein the threshold learning module issues control parameters that cause the exploratory controller to issue exploratory commands that alter a control state of the robot toward a desired control regime.

5. The threshold learning control system of claim 4, wherein the threshold learning module issues control parameters that cause the exploratory controller to issue exploratory commands that alter a control state of the robot away from an undesirable control regime.

6. The threshold learning control system of claim 1, wherein the threshold learning module receives one or more anchor points corresponding to the received at least one state-action map, each anchor point associated with a control regime and defining a point in control space, the regime classifier determining the control regime of the robot using the one or more anchor points.

7. The threshold learning control system of claim 6, wherein the regime classifier determines the control regime of the robot by determining whether a current robot state and action values are closer to an anchor point than to previously observed state-action pairs observed to be within the corresponding control regime for the anchor point.

8. A method of learning a robot controller of a robot, the method comprising:
receiving sensor inputs from a sensor system of the robot;
determining a control regime of the robot within a control space of a state-action map based on the received sensor inputs, the state-action map comprising control regimes arranged contiguously with boundaries therebetween, and each control regime providing a state-action space of possible robot states and robot actions in a corresponding control space;
determining control parameters for exploratory commands based on the received sensor inputs and determined control regime;
issuing exploratory commands to a control arbiter of the robot controller based on the control parameters, the control arbiter modifying the exploratory commands based on received control limits;
receiving feedback from the control arbiter of executed modified exploratory commands for determining the control parameters; and
learning the boundaries between control regimes within the state-action space of the state-action map using at least one of the received sensor inputs, determined control regime, anchor points of the state-action map, and feedback of the modified exploratory commands issued by the control arbiter.

9. The method of claim 8, further comprising determining the control limits based on at least one of the received sensor inputs and the received feedback of the executed modified exploratory commands.

10. The method of claim 8, further comprising determining the control parameters based on the received sensor inputs and the received feedback of executed modified exploratory commands.

11. The method of claim 8, further comprising determining control parameters that cause issuance of exploratory commands that alter a control state of the robot toward a desired control regime.

12. The method of claim 11, further comprising determining control parameters that cause issuance of exploratory commands that alter a control state of the robot away from an undesirable control regime.

13. The method of claim 8, further comprising:
receiving one or more anchor points corresponding to the state-action map, each anchor point associated with a control regime and defining a point in control space; and
determining the control regime of the robot using the one or more anchor points.

14. The method of claim 13, wherein determining the control regime of the robot comprises determining whether a current robot state and action values are closer to an anchor point than to previously observed state-action pairs observed to be within the corresponding control regime for the anchor point using the received sensor inputs.

15. A computer program product encoded on a non-transitory computer readable storage medium comprising instructions that when executed by a data processing apparatus cause the data processing apparatus to perform operations comprising:
receiving sensor inputs from a sensor system of a robot;
determining a control regime of the robot within a control space of a state-action map based on the received sensor inputs, the state-action map comprising control regimes arranged contiguously with boundaries therebetween, and each control regime providing a state-action space of possible robot states and robot actions in a corresponding control space;
determining control parameters for exploratory commands based on the received sensor inputs and determined control regime;
issuing exploratory commands to a control arbiter of the robot based on the control parameters, the control arbiter modifying the exploratory commands based on received control limits;
receiving feedback from the control arbiter of executed modified exploratory commands for determining the control parameters; and
learning the boundaries between control regimes within the state-action space of the state-action map using at least one of the received sensor inputs, determined control regime, anchor points of the state-action map, and feedback of the modified exploratory commands issued by the control arbiter.

16. The computer program product of claim 15, wherein the operations further comprise determining the control limits based on at least one of the received sensor inputs and the received feedback of the executed modified exploratory commands.

17. The computer program product of claim 15, wherein the operations further comprise determining the control parameters based on the received sensor inputs and the received feedback of executed modified exploratory commands.

18. The computer program product of claim 15, wherein the operations further comprise determining control parameters that cause issuance of exploratory commands that alter a control state of the robot toward a control regime having a regime score above a first threshold value.

19. The computer program product of claim 18, wherein the operations further comprise determining control parameters that cause issuance of exploratory commands that alter a control state of the robot away from a control regime having a regime score below a second threshold value.

20. The computer program product of claim 19, wherein the first and second threshold values are equal.

21. The computer program product of claim 15, wherein the operations further comprise:
receiving one or more anchor points corresponding to the state-action map, each anchor point associated with a control regime and defining a point in control space; and
determining the control regime of the robot using the one or more anchor points.

22. The computer program product of claim 21, wherein determining the control regime of the robot comprises determining whether a current robot state and action values are closer to an anchor point than previously observed state-action pairs observed to be within the corresponding control regime for the anchor point using the received sensor inputs.

* * * * *